Nov. 24, 1925.    1,563,269

F. FERGUSON

PIPE JOINT AND METHOD OF MAKING THE SAME

Filed March 25, 1924

Inventor
Frank Ferguson,
By Prentiss, Stone & Boyden,
Attorneys.

Patented Nov. 24, 1925.

1,563,269

UNITED STATES PATENT OFFICE.

FRANK FERGUSON, OF CHARLESTON, WEST VIRGINIA, ASSIGNOR TO EMERY E. FERGUSON, OF CHARLESTON, WEST VIRGINIA.

PIPE JOINT AND METHOD OF MAKING THE SAME.

Application filed March 25, 1924. Serial No. 701,725.

*To all whom it may concern:*

Be it known that I, FRANK FERGUSON, a citizen of the United States, residing at Charleston, in the county of Kanawha and State of West Virginia, have invented certain new and useful Improvements in Pipe Joints and Methods of Making the Same, of which the following is a specification.

This invention relates to pipe joints, and more particularly to permanent joints between a piece of lead pipe and a pipe fitting of a different metal, such as brass. Heretofore, joints of this character have usually been made either by flanging out the end of the lead pipe and clamping such flange between parts of the fitting, or else by means of what is commonly known in the plumbing trade as a wiped joint, the same consisting of a rounded mass of soft metal, applied in the molten state, and shaped by hand to form a union between the parts.

The object of the present invention is to provide a pipe joint which shall be tight, strong and efficient, and in which the necessity for employing the highly skillful wiping operation is obviated. I propose to produce my improved joint by the simple process of pouring molten solder, as will be hereinafter described.

In order that the invention may be readily understood, reference is had to the accompanying drawing, forming part of this specification, and in which:—

Figure 1:
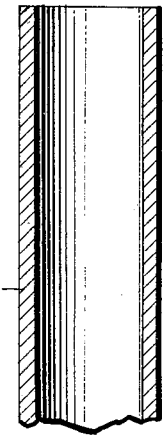
Figure 1 is a longitudinal fragmentary view of a piece of lead pipe.
Figure 2:
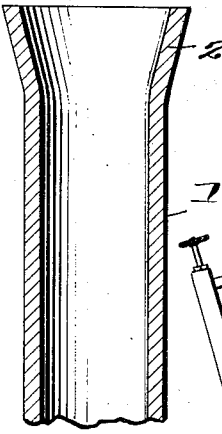
Figure 2 is a similar view showing the end of such pipe expanded, ready to receive the fitting.

Referring to the drawings in detail, I take a piece of plain lead pipe 1, and expand the end thereof by means of a suitable die or tool, to produce a flaring or bell-shaped portion 2, as clearly shown in Figure 2.

Any one of a number of different pipe fittings may be used in connection with the pipe shown in Figure 2, the only requirement being that the fitting be provided with a nipple portion somewhat longer than the flared or expanded portion 2 of the pipe, and of a size substantially equal to the interior diameter of the unexpanded portion of the pipe.

Figure 3:
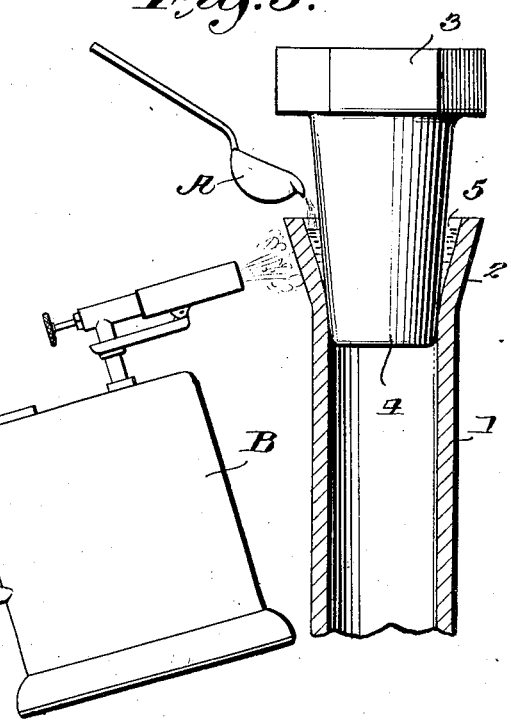
Figure 3 is a similar view showing the fitting inserted in the expanded end of the pipe, and also illustrating the solder pouring operation.

In Figure 3, I have shown such a fitting comprising an ordinary hexagonal head 3, provided with a screw threaded opening $3^a$, and having a nipple 4, the exterior of which is smooth, and preferably tapered, as illustrated.

In forming my improved joint, I take a fitting such as this, and first tin the exterior of the nipple portion 4 thereof, in any well known manner. I then insert the tinned nipple 4 into the flared or expanded end 2, of the pipe 1, as shown in Figure 3, the end of the nipple extending down into the interior bore of the pipe, and substantially filling the same, with a snug wedging fit. The pipe is then preferably held in a vertical position, as shown, and molten solder is poured, as by means of a ladle A, into the annular tapering space or chamber between the nipple and the expanded walls 2 of the lead pipe. The solder is indicated in Figure 3 by the reference numeral 5. It will be understood that the lower end of this tapering annular chamber is completely closed by reason of the tight fit between the nipple and the unexpanded portion of the pipe.

As the solder is being poured into this chamber, the outside of the expanded end of the pipe is strongly heated, as by means of a blow torch B, so as to prevent premature chilling of the solder, and to maintain it in a liquid state until it has firmly united with both the interior of the pipe end and the tinned surface of the nipple. Care must be exercised, of course, not to heat the pipe so strongly as to melt the lead, but since the melting point of lead is considerably higher than that of solder, it is entirely practical to apply heat enough to maintain the solder liquid without unduly softening the lead pipe itself.

The pouring of solder is continued until the annular space or chamber between the nipple and pipe end is entirely filled with the solder, and the parts are then allowed to cool.

Figure 4:
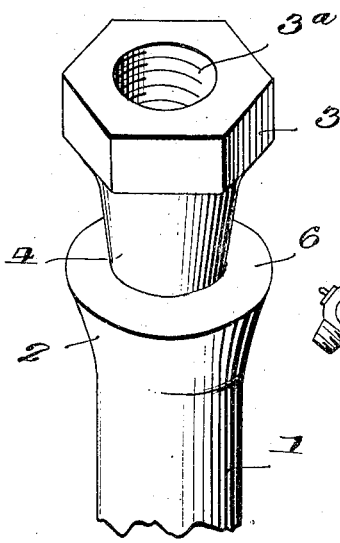
Figure 4 is a perspective view of the completed joint.

The finished joint resulting from this operation is shown in Figure 4, and by reference to this figure, it will be seen that the upper surface of the mass of solder is substantially flush and merges with the upper edge of the expanded end of the pipe, so that, when the joint is properly made, there is only visible a smooth annular ring of solder surrounding the nipple 4, as shown at 6 in Figure 4.

Tests have shown that a joint made in this way is exceedingly strong and rigid, the solder being practically integrally united with both the pipe and nipple. It will moreover be seen that the making of the joint is a very simple operation, involving no high degree of skill, and that the joint can be produced easily and rapidly on a commercial scale.

Figure 5:
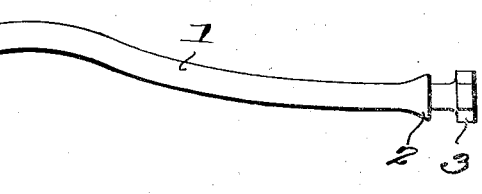
Figure 5 is a view in side elevation of a pipe connection, commonly called a "gooseneck", and provided with one of my improved joints at each end.

In Figure 5, I have shown a pipe connection commonly known in the plumbing trade as a gooseneck, the same consisting of a piece of lead pipe with a brass fitting at each end thereof. My improved joint is employed at both ends of this connection, as indicated at 2 and 2', the fitting 3, previously described being used at one end, and a special fitting 7, comprising a union or a turn plug, or both, being used at the other end, as occasion may require.

As above stated, my improved method of making these lead pipe joints is not limited to any particular kind of fitting, but may be employed in connection with any fitting having a nipple portion of the proper size and length.

What I claim is:—

1. A pipe joint comprising a lead pipe having its end expanded, a pipe connection having a nipple portion lying within but longer than such expanded end, said nipple portion snugly fitting the interior of the unexpanded part of the lead pipe, and a mass of solder cast in the annular tapering space between said nipple portion and the expanded end portion of the lead pipe and terminating substantially flush with the end of said pipe.

2. The hereindescribed method of joining a lead pipe to a pipe fitting of a different metal which comprises providing a fitting having a nipple portion of substantially the same size as the interior diameter of the lead pipe, tinning such nipple portion, expanding the end of the lead pipe for a distance less than the length of the nipple, inserting the tinned nipple portion of the fitting into such expanded end of the pipe, with the extreme end of the nipple extending into and substantially filling the bore of the unexpanded portion of pipe, and pouring molten solder into the tapering annular chamber between said nipple and expanded walls of the pipe end, while applying heat to the outside of the latter.

3. The hereindescribed method of joining a lead pipe to a pipe fitting of a different metal which comprises providing a fitting having a tapering nipple portion, the end of which is of substantially the same size as the interior diameter of the lead pipe, tinning such nipple portion, expanding the end of the lead pipe for a distance less than the length of the nipple, forcing the tinned tapering nipple portion of the fitting into such expanded end of the pipe so that the end of the nipple becomes wedged into and tightly fits the bore of the unexpanded portion of pipe, and pouring molten solder into the tapering annular chamber between said nipple and expanded walls of the pipe end.

In testimony whereof I affix my signature.

FRANK FERGUSON.